April 15, 1952 N. KAFKA 2,593,034

SUPPORTING STRUCTURE FOR ELECTRON DISCHARGE DEVICES

Filed Oct. 28, 1949

NICHOLAS KAFKA
*INVENTOR.*

BY Francis W. Crotty
HIS ATTORNEY

Patented Apr. 15, 1952

2,593,034

UNITED STATES PATENT OFFICE 2,593,034

SUPPORTING STRUCTURE FOR ELECTRON DISCHARGE DEVICES

Nicholas Kafka, Bellwood, Ill., assignor to Zenith Radio Corporation, a corporation of Illinois Application October 28, 1949, Serial No. 124,170

6 Claims. (Cl. 175—298)

This invention relates to a structure for supporting an electron-discharge device on a mounting member such as the chassis of a wave-signal receiver or the like. More particularly, this invention relates to a structure for supporting on such a mounting member a discharge device which is included in an electrical circuit of the type which gives rise to an extremely high potential difference between the electrodes of the discharge device and the mounting member.

The present invention is ideally suited for use in television receivers for supporting a rectifying device therein that is included in a circuit which supplies a potential of the order of 10 kilovolts to the anode of the cathode-ray image-reproducing tube. For this reason, the present invention will be described as applied to such a circuit in a television receiver. However, this utilization of the invention is given merely by way of example and is not to be construed as limiting the field to which the present invention may be applied.

It is usual practice in a present-day television receiver to derive high potential, required for energizing the anode of the cathode-ray image-reproducing tube, from the horizontal deflection circuit of the receiver. A sharp high-potential pulse of the order of 10 kilovolts may be obtained from this circuit during each retrace interval of the cathode-ray beam in the reproducing tube. This high-potential pulse is rectified and filtered in well-known manner, and the resulting unidirectional potential is applied to the anode of the cathode-ray tube. The major difficulty encountered in such an arrangement is to provide a suitable structure for the rectifier device capable of supporting the device and insulating it from the mounting member or chassis of the receiver, this member being usually established as ground or reference potential.

The present invention provides a rugged supporting structure for an electron-discharge device, which structure additionally acts as a high-potential insulator between the electrodes of the device and the member on which the structure is mounted. A feature of this supporting structure is that one of its components also functions as a necessary electrical element in a power-supply circuit, when the structure is used to support a rectifying device included in such a circuit.

It is, accordingly, an object of this invention to provide an improved supporting structure for an electron-discharge device which acts to support the device on a mounting member of a wave-signal receiver or the like, and which additionally acts as an insulator capable of withstanding extremely high potential differences that may exist between the electrodes of the device and the mounting member.

A further object of this invention is to provide such an improved supporting structure that may be quickly and easily assembled, and which comprises relatively few component parts.

Another object of this invention is to provide such an improved supporting structure that is extremely simple and inexpensive, and yet operates in a highly satisfactory manner.

The features of this invention which are believed to be new are set forth with particularity in the appended claims. The invention itself, however, together with further objects and advantages thereof may best be understood by reference to the following description when taken in conjunction with the accompanying drawing, in which:

Figure 1:
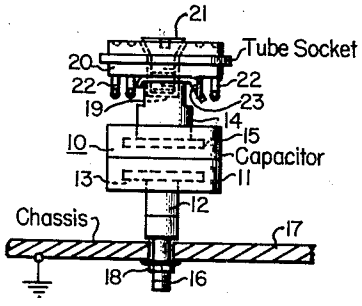
Figure 1 shows one embodiment of the invention.

Referring now to Figure 1, the symbol 10 designates a capacitor, preferably of the ceramic type and capable of withstanding extremely high potential differences between its electrodes. For example, when the structure is utilized to support the rectifying device in a power supply delivering a high potential of the order of 10 kilovolts, the capacitor 10 preferably has a potential rating of the order of 20 kilovolts.

Ceramic capacitors are well known in the art, and the preferred type for use in the present invention comprises a plastic cylindrical housing 11, a metallic shaft 12 connected to one electrode 13 of the capacitor, and a further metallic shaft 14 connected to the other electrode 15 of the capacitor. The housing 11 is molded to the shafts 12 and 14 to form a solid unitary assembly. The shaft 12 has a threaded portion 16 adapted to extend through an aperture in a mounting member or chassis 17 and a nut 18 is threaded to the shaft 12 to secure the capacitor 10 to the chassis in an upright position, as shown.

The shaft 14 is made tubular at its upper end as indicated by the symbol 19 and has internal threads formed therein. A tube socket 20 of any known type having a central aperture formed therein, is secured to the shaft 14 by means of a screw 21 extending through the central aperture and threaded to the internal threads of the tubular portion 19. The socket 20 has a plurality of terminal members 22 for engaging the pins of a discharge device which may be inserted therein, and a selected one of these members is connected to the shaft 14 by means of a clip 23 secured to the shaft and to the selected member. To prevent the possibility of rotation of the socket 20 relative to the shaft 14, it is desirable that the shaft 14 have a flattened portion and the clip 23 be fitted over this flattened portion. In this manner the clip 23 also acts to ensure that there is no rotation of the socket 20 on shaft 14.

Figure 2:
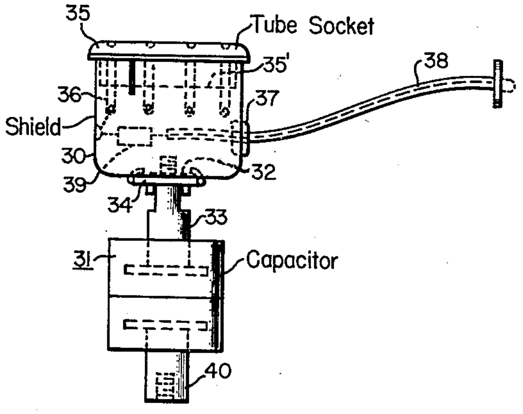
Figure 2 shows a second embodiment of the invention.

Referring now to Figure 2 which illustrates a second embodiment of the invention, a metal cup-like shield 30 is supported by a capacitor 31 (which may be similar to capacitor 10) by means of a nut 32 threaded to a shaft 33 of the capacitor. Relative rotation between the shield 30 and the shaft 33 is prevented by means of a clip 34 fitted over a flattened portion of the shaft and engaging the shield through apertures formed therein.

A tube socket 35 is supported at the upper end of the shield 30 by a resilient engagement between the shield and an inserted portion 35' of the socket. The socket 35 has a plurality of members 36 which engage the pins of an electron-discharge device which may be inserted in the socket. A selected one of the pin-engaging members 36 is conductively connected to the shield 30. The shield further has an aperture formed therein and fitted with a rubber gasket 37. A lead 38 extends through the gasket 37 and may be conductively connected to the metal shield 30 through a resistor 39. The second shaft 40 of the capacitor 31 may be connected in well known manner to the chassis of a wave-signal receiver or the like to support the capacitor 31 in an upright position.

Figure 3:
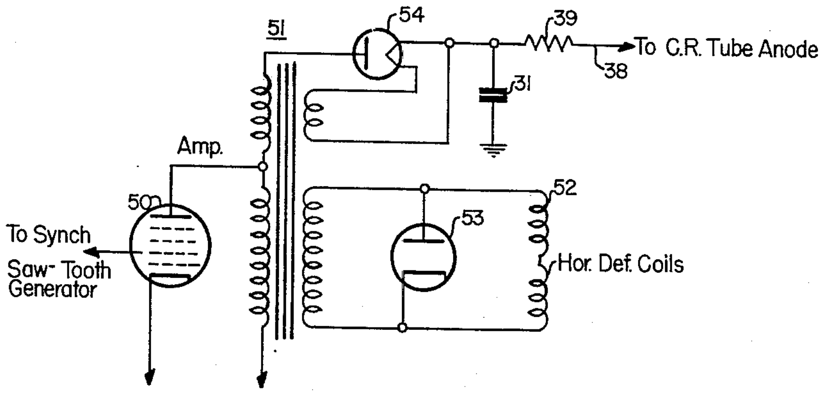
Figure 3 shows a fragment of the high voltage power-supply circuit of a television receiver in which the present invention finds useful application.

The circuit of Figure 3 includes an electron-discharge device 50 for amplifying a saw-tooth wave impressed thereon. This device has its input electrodes connected to the saw-tooth generator (not shown) of a television receiver which, in turn, is synchronized with incoming synchronizing signals. The output electrodes of the device 50 are coupled to the primary winding of an output transformer 51. The secondary winding of the transformer 51 is connected to the horizontal deflection coils 52 of the cathode-ray image-reproducing tube of the receiver, these coils being shunted by a usual damping tube 53.

The circuit of Figure 3 also supplies, in well known manner, a high unidirectional potential to the anode of the receiver cathode-ray tube by means of a circuit which includes a rectifying device 54. One requirement of this type of power supply circuit is the necessity that the cathode of device 54 be operated at a high potential with respect to the chassis of the receiver. This requirement makes it necessary that the device 54 be supported on and insulated from the chassis of the receiver by an insulating structure capable of withstanding extremely high voltages.

The present invention may readily be applied to the circuit of Figure 3. For example, when the embodiment of Figure 2 is utilized, the device 54 is plugged into the socket 35. The selected member 36 connected to shield 30 is the one engaging the cathode pin of device 54, and the resistor 39 is connected inside the metal shield 30 between the lead 38 and the metal shield. The capacitor 31 cooperates to form a supporting and insulating structure for the device 54, and also acts as a filter condenser in the power supply circuit.

This invention provides, therefore, an extremely simple structure for supporting an electron-discharge device on a mounting member, and provides an insulation between the electrodes of the device and the mounting member capable of withstanding extremely high potential difficulties.

While particular embodiments of the invention have been shown and described modifications may be made, and it is intended in the appended claims to cover all such modifications as fall within the true spirit and scope of the invention.

I claim:

1. A structure for supporting an electron-discharge device on a conductive support and for insulating said device from said support, said device having externally extending pins connected to electrodes contained in said device, said structure comprising: a solid unitary capacitor assembly including, a housing, a pair of electrodes within said housing, a first conductive member connected to one of said capacitor electrodes and extending through said housing for mechanical and electrical connection to said support, and a second conductive member connected to the other of said capacitor electrodes and extending through said housing; a socket for supporting said discharge device, said socket including a plurality of terminal members for engaging said pins and for connecting at least one of said pins to said second conductive member; and means for mechanically securing said socket to said second conductive member.

2. A structure for supporting an electron-discharge device on a conductive support and for insulating said device from said support, said device having externally extending pins connected to electrodes contained in said device, said structure comprising: a solid unitary capacitor assembly including, a housing, a pair of electrodes within said housing, a first conductive member connected to one of said capacitor electrodes and extending through one end of said housing for mechanical and electrical connection to said support, and a second conductive member connected to the other of said capacitor electrodes and extending through the opposite end of said housing; a socket for supporting said discharge device and including a plurality of terminal members for engaging said pins; means for mechanically securing said socket to said second conductive member; and an electrical connection extending from at least one of said terminal members to said second conductive member.

3. A structure for supporting an electron-discharge device on a conductive support and for insulating said device from said support, said device having externally extending pins connected to electrodes contained in said device, said structure comprising: a ceramic capacitor including, a pair of electrodes, a first conductive member connected to one of said capacitor electrodes for mechanical and electrical connection to said support, a second conductive member connected to the other of said capacitor electrodes, and a molded plastic housing enclosing said pair of capacitor electrodes and forming a solid unitary assembly with said first and second conductive members; a socket for supporting said discharge device and including a plurality of terminal members for engaging said pins; means for mechanically securing said socket to said second conductive member; and a conductive clip for electrically connecting a selected one of said terminal members to said second conductive member.

4. A structure for supporting an electron-discharge device on a conductive support and for insulating said device from said support, said device having externally extending pins connected to electrodes contained in said device, said structure comprising: a solid unitary capacitor assembly including, a housing, a pair of electrodes within said housing, a first conductive member connected to one of said capacitor electrodes and extending through one end of said housing for mechanical and electrical connection to said support, and a second conductive member connected to the other of said capacitor electrodes and extending through the opposite end of said housing; a socket for supporting said discharge device having a central aperture and including a plurality of terminal members surrounding said aperture for engaging said pins; a screw extending through said aperture and threaded to said second conductive member for securing said socket to said second conductive member; and a conductive clip secured to said second conductive member and to a selected one of said terminal members for electrically connecting said selected terminal member to said second conductive member and for preventing relative rotation between said socket and said second conductive member.

5. A structure for supporting an electron-discharge device on a conductive support and for insulating said device from said support, said device having externally extending pins connected to electrodes contained within said device, said structure comprising: a solid unitary capacitor assembly including, a housing, a pair of electrodes within said housing, a first conductive member connected to one of said capacitor electrodes and extending through one end of said housing for mechanical and electrical connection to said support, and a second conductive member connected to the other of said capacitor electrodes and extending through the opposite end of said housing; a cup-like conductive shield mechanically and electrically secured to said second conductive member; a socket mounted on said shield for supporting said discharge device and including a plurality of terminal members for engaging said pins and extending into said cup-like shield; and a connection between a selected one of said terminal members and said second conductive member.

6. A structure for supporting an electron-discharge device on a conductive support and for insulating said device from said support, said device having externally extending pins connected to electrodes contained within said device, said structure comprising: a solid unitary capacitor assembly including, a housing, a pair of electrodes within said housing, a first conductive member connected to one of said capacitor electrodes and extending through one end of said housing for mechanical and electrical connection to said support, and a second conductive member connected to the other of said electrodes and extending through the opposite end of said housing; a cup-like conductive shield mechanically and electrically secured to said second conductive member and having an aperture formed therein; a socket mounted on said shield for supporting said discharge device and including a plurality of terminal members for engaging said pins and extending into said cup-like shield; a connection between a selected one of said terminal members and said second conductive member causing said capacitor to act as a by-pass for the electrode of said discharge device associated with said selected terminal member; an electrical lead extending through said aperture into said cup-like shield; and a resistor connecting said lead to said selected terminal member.

NICHOLAS KAFKA.

REFERENCES CITED

The following references are of record in the file of this patent:

UNITED STATES PATENTS

| Number | Name | Date |
|---|---|---|
| 1,526,353 | Livingston | Feb. 17, 1925 |
| 1,683,202 | MacDonald | Sept. 4, 1928 |
| 1,825,534 | Mavrogenis | Sept. 29, 1931 |
| 2,462,489 | Hallett | Feb. 22, 1949 |

FOREIGN PATENTS

| Number | Country | Date |
|---|---|---|
| 573,514 | France | June 25, 1924 |
| 228,014 | Great Britain | Jan. 29, 1925 |
| 539,410 | Germany | Nov. 25, 1931 |